(12) United States Patent
Hazelton et al.

(10) Patent No.: US 10,361,013 B2
(45) Date of Patent: Jul. 23, 2019

(54) TRIAXIAL MINERAL INSULATED CABLE IN FLAME SENSING APPLICATIONS

(71) Applicant: General Electric Company, Schenectady, NY (US)

(72) Inventors: Troy David Hazelton, Sagamore Hills, OH (US); Frederick Louis Glesius, Brecksville, OH (US); John Patrick Doyle, Strongsville, OH (US); Alan Rex Hoffman, Chesterland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 67 days.

(21) Appl. No.: 15/678,661

(22) Filed: Aug. 16, 2017

(65) Prior Publication Data

US 2017/0345529 A1 Nov. 30, 2017

Related U.S. Application Data

(63) Continuation of application No. 14/551,240, filed on Nov. 24, 2014, now Pat. No. 9,773,584.

(51) Int. Cl.
*H01B 7/02* (2006.01)
*H01B 7/295* (2006.01)
(Continued)

(52) U.S. Cl.
CPC .............. *H01B 7/295* (2013.01); *F23R 3/42* (2013.01); *H01B 3/08* (2013.01); *H01B 3/40* (2013.01);
(Continued)

(58) Field of Classification Search
CPC .......... G02B 6/4463; H02G 3/00; H02G 3/30; H02G 15/025; H01B 13/0036; H01B 3/08; H01B 3/40; H01B 7/0225; H01B 7/295
See application file for complete search history.

(56) References Cited

U.S. PATENT DOCUMENTS 2,963,620 A * 12/1960 Knudson ................. H01T 13/58
123/169 R
3,185,846 A 5/1965 Gilbert et al.
(Continued)

FOREIGN PATENT DOCUMENTS

CN 101807336 A 8/2010
CN 201867370 U 6/2011
(Continued)

OTHER PUBLICATIONS

A U.S. Non-Final OA issued in connection with Related U.S. Appl. No. 13/488,731 dated May 21, 2015-cited in parent application.
(Continued)

*Primary Examiner* — William H. Mayo, III
*Assistant Examiner* — Krystal Robinson
(74) *Attorney, Agent, or Firm* — Mintz Levin Cohn Ferris Glovsky and Popeo, P.C.

(57) ABSTRACT

An apparatus and method for flame sensing within a turbine. A sensor assembly, an electrical assembly and a cable assembly extending therebetween. A photodiode generates an electrical signal and the electrical assembly determines a characteristic. An inner conductor electrically connects the photodiode to the electrical assembly. A first insulating layer, with mineral insulation material, surrounds the inner conductor. An inner sheath, with electrically conductive material, surrounds the first insulating layer. A second insulating layer, with mineral insulation material, surrounds the inner sheath. An outer sheath, with an electrically conductive, metal material, surrounds the second insulating layer. The cable assembly is configured for use up to about 300 degrees Celsius or greater. The portions of the cable are constructed and configured, and connected between the sensor assembly and the electrical assembly, to enclose the inner conductor
(Continued)

such that the inner conductor is not exposed outside of confines of the cable.

20 Claims, 4 Drawing Sheets

(51) Int. Cl.
*H01B 3/40* (2006.01)
*H01B 3/08* (2006.01)
*H01B 13/00* (2006.01)
*F23R 3/42* (2006.01)
*H02G 15/02* (2006.01)

(52) U.S. Cl.
CPC ....... *H01B 7/0225* (2013.01); *H01B 13/0036* (2013.01); *H02G 15/025* (2013.01)

(56) References Cited

U.S. PATENT DOCUMENTS

| | | | |
|---|---|---|---|
| 3,212,261 A | 10/1965 | Rose | |
| 3,280,882 A | 10/1966 | Hemker | |
| 3,689,773 A | 9/1972 | Wheeler | |
| 3,824,391 A | 7/1974 | Noltingk et al. | |
| 3,958,126 A | 5/1976 | Bryant | |
| 3,967,255 A * | 6/1976 | Oliver | G08B 17/12 169/61 |
| RE29,143 E | 2/1977 | Bianchini | |
| 4,039,844 A | 8/1977 | MacDonald | |
| 4,220,857 A | 9/1980 | Bright | |
| 4,322,723 A * | 3/1982 | Chase | F23N 5/082 340/507 |
| 4,623,508 A * | 11/1986 | Glesius | H01J 47/1233 250/390.01 |
| 4,804,905 A | 2/1989 | Ding et al. | |
| 4,913,647 A | 4/1990 | Bonne et al. | |
| 5,384,467 A | 1/1995 | Plimon et al. | |
| 5,487,266 A | 1/1996 | Brown | |
| 5,488,355 A | 1/1996 | Tindall et al. | |
| 5,659,133 A | 8/1997 | Sims et al. | |
| 5,670,784 A | 9/1997 | Cusack et al. | |
| 5,755,819 A | 5/1998 | Bonanni et al. | |
| 5,828,797 A * | 10/1998 | Minott | F01D 17/02 250/227.23 |
| 5,857,845 A | 1/1999 | Paciorek | |
| 5,978,525 A | 11/1999 | Shu et al. | |
| 6,013,919 A | 1/2000 | Schneider et al. | |
| 6,244,856 B1 | 6/2001 | Winnington et al. | |
| 6,473,705 B1 | 10/2002 | Conners | |
| 6,599,028 B1 | 7/2003 | Shu et al. | |
| 7,229,278 B1 | 6/2007 | Newberry | |
| 7,334,413 B2 | 2/2008 | Myhre | |
| 7,441,411 B2 | 10/2008 | Gleeson et al. | |
| 7,987,712 B2 | 8/2011 | Myhre et al. | |
| 8,430,666 B1 | 4/2013 | Clevenger et al. | |
| 8,456,634 B2 | 6/2013 | McManus et al. | |
| 9,068,747 B2 | 6/2015 | Huang | |
| 9,188,463 B2 | 11/2015 | Olecgnowicz et al. | |
| 9,530,904 B2 | 12/2016 | Blakemore et al. | |
| 2001/0035952 A1 | 11/2001 | Merklein | |
| 2005/0266363 A1 | 12/2005 | Ganeshan | |
| 2006/0059917 A1 * | 3/2006 | Plimpton | F01D 17/08 60/772 |
| 2006/0088793 A1 | 4/2006 | Brummel et al. | |
| 2007/0207423 A1 | 9/2007 | Chase et al. | |
| 2007/0281260 A1 | 12/2007 | McLellan | |
| 2008/0073104 A1 * | 3/2008 | Barberree | H01R 9/0503 174/93 |
| 2008/0289342 A1 | 11/2008 | Sappey et al. | |
| 2009/0015271 A1 | 1/2009 | Elliott | |
| 2009/0049894 A1 | 2/2009 | Wilbraham | |
| 2010/0071375 A1 | 3/2010 | Myhre | |
| 2010/0220182 A1 | 9/2010 | Krull et al. | |
| 2010/0258329 A1 | 10/2010 | Engelbach et al. | |
| 2010/0332103 A1 | 12/2010 | Dean et al. | |
| 2011/0296844 A1 | 12/2011 | Widener et al. | |
| 2012/0190394 A1 | 7/2012 | Kwon et al. | |
| 2012/0279230 A1 | 11/2012 | Botarelli | |
| 2013/0273483 A1 * | 10/2013 | Spalding | G01J 5/0821 431/79 |
| 2013/0318994 A1 | 12/2013 | Hoffman et al. | |
| 2014/0124235 A1 | 5/2014 | Blakemore | |
| 2014/0124260 A1 | 5/2014 | Blakemore et al. | |
| 2014/0216155 A1 | 8/2014 | Olechnowicz et al. | |
| 2015/0364230 A1 * | 12/2015 | Kataoka | B29C 45/0025 174/74 R |
| 2016/0087112 A1 * | 3/2016 | Blakemore | H01L 31/0203 257/433 |
| 2010/0369649 | 12/2016 | Olechnowicz et al. | |

FOREIGN PATENT DOCUMENTS

| | | | | |
|---|---|---|---|---|
| CN | 201964955 U | 9/2011 | | |
| EP | 0816760 A1 | 1/1998 | | |
| EP | 0942232 A2 | 3/1998 | | |
| EP | 2461430 A1 * | 6/2012 | | H01R 9/05 |
| FR | 2938326 A1 | 5/2010 | | |
| WO | 2016085583 A1 | 6/2016 | | |

OTHER PUBLICATIONS

A U.S. Final OA issued in connection with Related U.S. Appl. No. 13/488,731 dated Jul. 17, 2015-cited in parent application.
A PCT Search Report and Written Opinion issued in connection with Related PCT Application No. PCT/US2015/044798 dated Nov. 20, 2015-cited in parent application.
A Chinese Office Action issued in connection with Related CN Application No. 201310220267.7 dated Feb. 29, 2016-cited in parent application.
A U.S. Notice of Allowance issued in connection with Related U.S. Appl. No. 13/488,731 dated May 5, 2016-cited in parent application.
A U.S. Non-Final OA issued in connection with Related U.S. Appl. No. 14/494,856 dated May 12, 2016-cited parent application.
International Search Report and Written Opinion issued in connection with corresponding PCT Application No. PCT/US2015/055750 dated Jan. 29, 2016. Cited in parent application.
Spectra GT30 Gas Turbine Flame Sensor brochure from AMETEK Power Instruments, Ametek, Inc, with Copyright date of 2005.

* cited by examiner

TRIAXIAL MINERAL INSULATED CABLE IN FLAME SENSING APPLICATIONS

RELATED APPLICATION

The present application is a continuation application of U.S. patent application Ser. No. 14/551,240, filed Nov. 24, 2014. Benefit of priority is claimed from U.S. patent application Ser. No. 14/551,240 and the entire disclosure of which is expressly incorporated herein by reference.

BACKGROUND

Field of the Subject Matter

The subject matter relates to a flame sensor apparatus, and specifically relates to an insulated cable for a flame sensor apparatus that senses characteristics of a flame in a combustion chamber.

Discussion of Prior Art

Within an oil or gas fueled turbine, fuel is fed into a combustion chamber within which an ignition flame is present. If the flame becomes extinguished, commonly referred to as a flame-out condition, it is undesirable for fuel to continue to be fed into the hot combustion chamber without appropriate ignition. Consequently, if the ignition flame is extinguished within the combustion chamber, the fuel feed into the combustion chamber should be quickly terminated and thus limit un-combusted fuel build up.

A flame sensor is generally used for detecting the presence or absence of an ignition flame, as well as the flame's relative intensity, within a combustion chamber of a gas turbine. Also, flame sensing electronics are commonly associated with the flame sensor within the turbine arrangement. The flame sensing electronics may be temperature sensitive and can be located a distance from the relatively hot temperature(s) in and near the combustion chamber. A low magnitude current signal from a sensor assembly near the combustion chamber can be transferred to the flame sensing electronics. The signal can be transferred via a cable assembly that is part of a sealed environment that helps preserve the low magnitude current signal. It would be useful to provide an insulated cable assembly that is capable of withstanding relatively high temperatures near the combustion chamber without losing insulation resistance.

BRIEF DESCRIPTION OF THE SUBJECT MATTER

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, a flame sensor apparatus for sensing presence of a flame within a combustion chamber of a turbine is provided. The apparatus includes a sensor assembly, an electrical assembly and a cable assembly extending between the sensor assembly and the electrical assembly. The sensor assembly includes a photodiode configured to generate an electrical signal indicative of at least one characteristic of the flame. The electrical assembly is configured to receive the electrical signal flame and is configured to determine the at least one characteristic of the flame. The cable assembly includes an inner conductor electrically connected to the photodiode and configured to transmit the electrical signal from the photodiode to the electrical assembly. The cable assembly includes a first insulating layer circumferentially surrounding the inner conductor. The first insulating layer includes a mineral insulation material. The cable assembly includes an inner sheath circumferentially surrounding the first insulating layer. The inner sheath includes an electrically conductive material. The cable assembly includes a second insulating layer circumferentially surrounding the inner sheath. The second insulating layer includes a mineral insulation material. The cable assembly includes an outer sheath circumferentially surrounding the second insulating layer. The outer sheath includes an electrically conductive, metal material. The cable assembly is configured for use up to about 300 degrees Celsius or greater. The outer sheath, the second insulating layer, the inner sheath and the first insulating layer are constructed and configured, and connected between the sensor assembly and the electrical assembly, to enclose the inner conductor such that the inner conductor is not exposed outside of confines of the cable.

In accordance with another aspect, a method of providing a flame sensor apparatus for sensing presence of a flame within a combustion chamber of a turbine is provided. The method includes providing a sensor assembly, with the sensor assembly having a photodiode configured to generate an electrical signal indicative of at least one characteristic of the flame. The method includes providing an electrical assembly, with the electrical assembly configured to receive the electrical signal indicative of at least one characteristic of the flame and being configured to determine the at least one characteristic of the flame. The method includes providing a cable assembly to extend between the sensor assembly and the electrical assembly. The cable assembly includes an inner conductor electrically connected to the photodiode and is configured to transmit the electrical signal from the photodiode to the electrical assembly. The cable assembly includes a first insulating layer circumferentially surrounding the inner conductor. The first insulating layer includes a mineral insulation material. The cable assembly includes an inner sheath circumferentially surrounding the first insulating layer. The inner sheath includes an electrically conductive material. The cable assembly includes a second insulating layer circumferentially surrounding the inner sheath. The second insulating layer includes a mineral insulation material. The cable assembly include an outer sheath circumferentially surrounding the second insulating layer. The outer sheath includes an electrically conductive, metal material. The cable assembly is configured for use up to about 300 degrees Celsius or greater. The method includes constructing and configuring the outer sheath, the second insulating layer, the inner sheath and the first insulating layer, and connecting the outer sheath metal, the second insulating layer, the inner sheath and the first insulating layer between the sensor assembly and the electrical assembly, to enclose the inner conductor such that the inner conductor is not exposed outside of confines of the cable.

BRIEF DESCRIPTION OF THE DRAWINGS

The foregoing and other aspects of the disclosed subject matter will become apparent to those skilled in the art to which the subject matter relates upon reading the following description with reference to the accompanying drawings, in which.

DETAILED DESCRIPTION OF THE SUBJECT MATTER

Example embodiments that incorporate one or more aspects of the disclosed subject matter are described and illustrated in the drawings. These illustrated examples are not intended to be a limitation on the subject matter. For example, one or more aspects of the subject matter can be utilized in other embodiments and even other types of devices. Moreover, certain terminology is used herein for convenience only and is not to be taken as a limitation on the subject matter. Still further, in the drawings, the same reference numerals are employed for designating the same elements.

Figure 1:
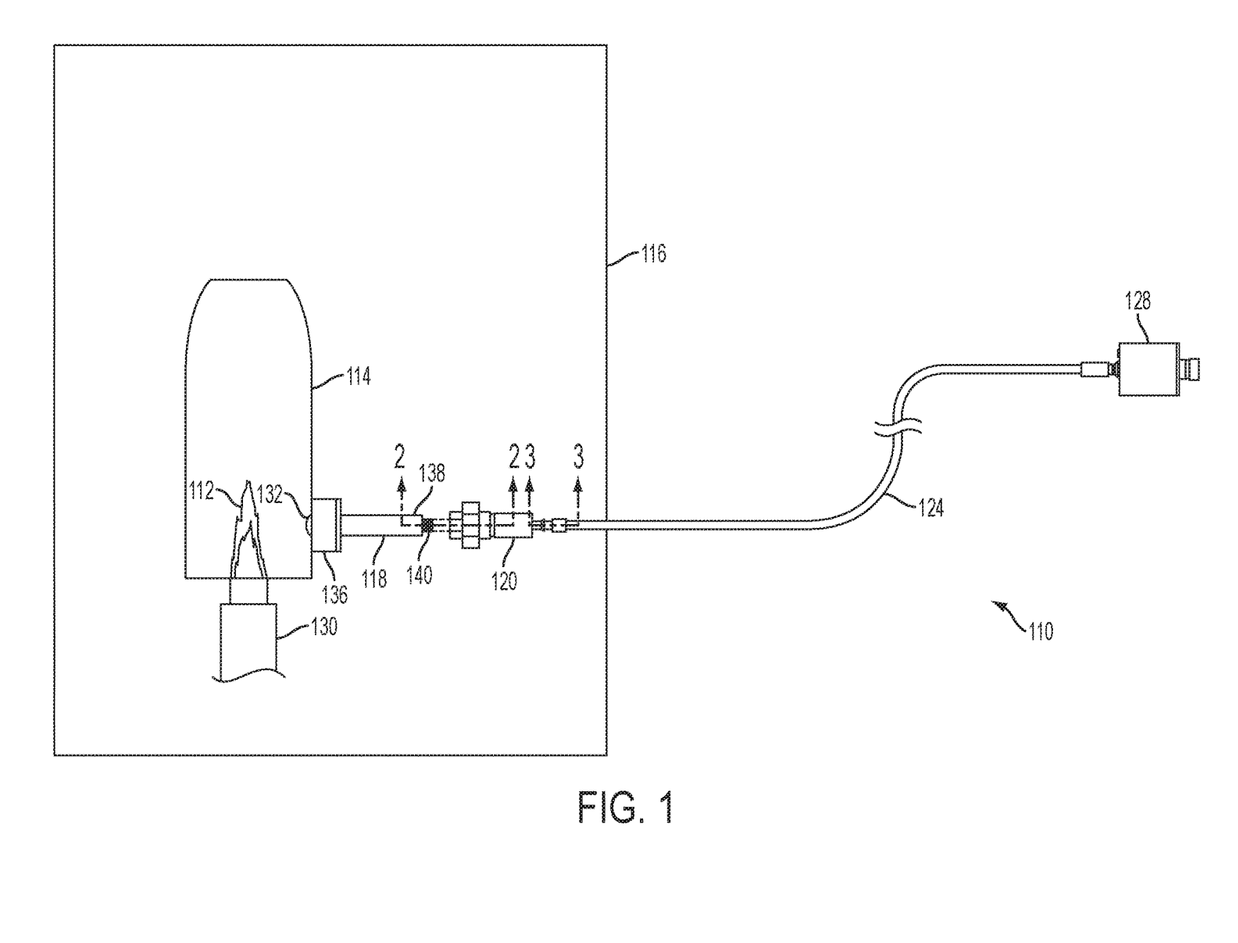
FIG. 1 is a schematized, partially cross-section view of an example flame sensor apparatus in accordance with at least one aspect of the disclosed subject matter.

FIG. 1 schematically illustrates an example flame sensor apparatus 110 for monitoring specific characteristics of a flame 112. The flame 112 is located within a combustion chamber 114 (schematically shown) of a turbine 116 (schematically shown) and emits electromagnetic radiation energy. A sight tube 118 can be attached to the combustion chamber 114. A sensor assembly 120 is operably connected with the combustion chamber 114 and can receive the electromagnetic radiation energy from the flame 112 through the sight tube 118. The sensor assembly 120 includes a photodiode, which generates a current, such as a photocurrent, based on the electromagnetic radiation energy. This current can then pass from the sensor assembly 120, through a cable assembly 124, and to an electrical assembly 128, whereupon the electrical assembly 128 can determine the flame's characteristics, such as the presence or absence of the flame, relative intensity of the flame, or combustion efficiency based on the spectrum the flame 112 emits. In an example, the electrical assembly 128 can be physically remote from the photodiode within the sensor assembly 120. As such, the electrical assembly 128 monitors the flame's characteristics while being located in a relatively cooler environment away from the combustion chamber 114 and turbine 116 and heat associated with the flame of combustion.

Turning to the example shown in FIG. 1, the turbine 116 can include rotating turbine blades (not shown) powered by fuel combustion within the combustion chamber 114. The turbine 116 is generically illustrated in FIG. 1 to convey the concept that the turbine 116 can include a number of different structures and/or could be used in varied, different applications. For example, the turbine 116 could be constructed/configured for oil and gas combustion turbines, marine used in applications such as for aircraft propulsion, marine propulsion, land-based power generation, off shore power generation, or the like. In an example, the turbine 116 and flame sensor apparatus 110 can be used in power generation applications. As such, it is to be appreciated that the turbine 116 in FIG. 1 is not intended to be limiting on further examples.

The combustion chamber 114 can be positioned within the turbine 116. The combustion chamber 114 can define a substantially hollow internal area. It is to be understood that the combustion chamber 114 is generically represented in FIG. 1, and is not intended to be limiting on further examples. For instance, the generic representation of the combustion chamber 114 is intended to convey the concept that the combustion chamber 114 can represent a number of different constructions, some of which may be generally known. Similarly, the combustion chamber 114 described herein and as in association with the turbine 116 discussed above may be incorporated into a number of different applications.

A fuel nozzle 130 can be provided that delivers fuel (e.g., air, fuel, combustible materials, etc.) into the combustion chamber 114. The fuel nozzle 130 can cooperate with an opening, orifice, or the like in the combustion chamber 114 such that the fuel nozzle 130 can deliver the fuel from an exterior location into the combustion chamber 114. As such, the fuel nozzle 130 can deliver the fuel into the combustion chamber, whereupon the fuel can be ignited to propagate the flame 112. Ignited fuel within the combustion chamber 114 produces a relatively high-pressure gas. Again, the fuel nozzle 130 is generically represented in the shown example, and may include any number of fuel nozzle constructions that may be known. Further, the fuel nozzle 130 could be positioned at a number of locations within the combustion chamber 114, and is not limited to the location shown in FIG. 1.

An opening 132 can be provided in an outer wall of the combustion chamber 114. The opening 132 (illustrated in FIG. 1) can extend completely through the outer wall. As such, an interior of the combustion chamber 114 can be optically exposed to a location that is exterior from the combustion chamber 114. The opening 132 can be positioned in near proximity to the flame 112, such that the opening 132 defines an optical path through the opening 132 and towards the flame 112. The temperature adjacent the opening 132 can, in one example, be greater than about 300 degrees Celsius ("C"), though a wide range of temperatures are contemplated. It is to be understood that the opening 132 is not limited to the location shown in FIG. 1, and could be positioned at a number of different locations on the combustion chamber 114.

The sight tube 118 is located in the optical path from the flame 112 and through the opening 132. FIG. 1 depicts the sight tube 118 for illustrative purposes to show the structural relationship between the sight tube 118 and the opening 132. It is to be understood, however, that in operation, the sight tube 118 and combustion chamber 114 are in a fully assembled state with the sight tube 118 attached to the combustion chamber 114. The sight tube 118 can be attached to the combustion chamber 114 in any number of ways, such as by mechanical fasteners, welding, adhesives, or the like.

In one example, the sight tube 118 can be an elongated, substantially hollow cylindrical structure that defines an internal bore. The sight tube 118 is attached to the opening 132, such that an interior of the combustion chamber 114 is optically exposed to the internal bore of the sight tube 118. In operation, the internal bore of the sight tube 118 can be aligned with the opening 132, such that the sight tube 118 defines an optical path through the internal bore, through the opening 132, and into the interior area of the combustion chamber 114. As such, electromagnetic radiation energy from the flame 112 propagates through the internal bore of the sight tube 118.

The sight tube 118 can include a proximal end 136 and a distal end 138. The proximal end 136 is located near the opening 132, and the distal end 138 is located opposite the proximal end 136. An attachment structure, such as a threaded portion or a screw thread 140, can be positioned at the distal end 138 of the sight tube 118. It is to be understood that the sight tube 118 could include any number of attachment structures, and is not limited to the screw thread 140 shown in FIG. 1. In one example, the screw thread 140 can be formed at an outer surface of the distal end 138 of the sight tube 118, so as to form an external male thread. The sensor assembly 120 can be threadingly engaged with the screw thread 140 on the sight tube 118.

Figure 2:
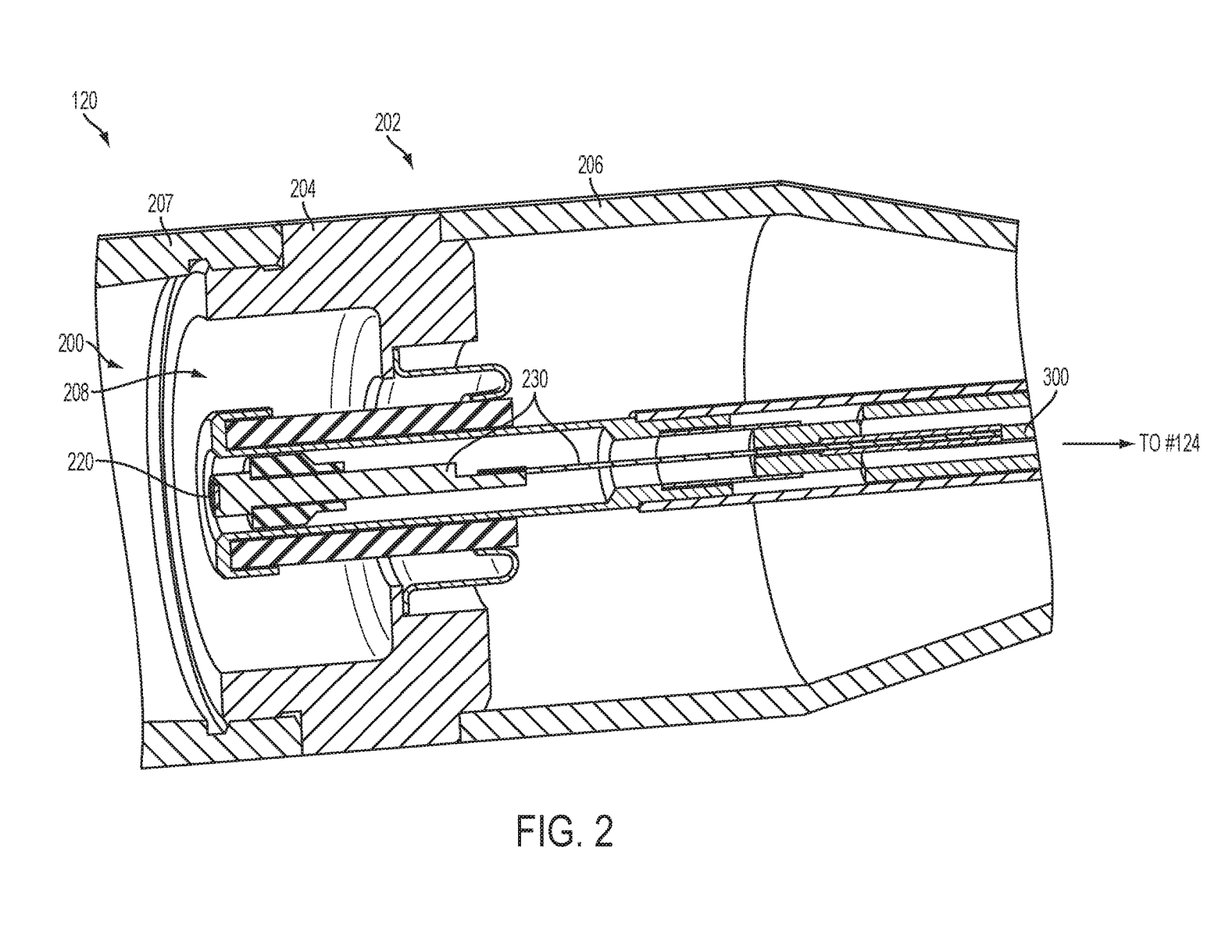
FIG. 2 is an enlarged sectional view of an example sensor assembly along lines 2-2 of FIG. 1.

Turning to FIG. 2, a sectional view of a portion of the sensor assembly 120 along lines 2-2 of FIG. 1 is illustrated. What follows is a simplified description for the purpose of clarity, and it is to be appreciated that the sensor assembly 120 can include additional components than those described here.

The sensor assembly 120 can include a seal assembly 200 positioned within a sensor housing 202. The sensor housing 202 can include one or more housing portions. In the illustrated example of FIG. 2, the sensor housing 202 includes a first housing portion 204, a second housing portion 206 and a third housing portion 207. The first housing portion 204 can be attached to the second housing portion 206 and to the third housing portion 207 in any number of ways, such as by welding, brazing, screw threading, etc. Once attached, the first housing portion 204, the second housing portion 206 and the third housing portion 207 can extend generally coaxially with respect to each other along a common axis. In this example, the third housing portion 207 can function as a lens housing, for example, with the third housing portion 207 of the sensor housing 202 being directly or indirectly attached to the sight tube 118.

The sensor housing 202, including the first housing portion 204 and the third housing portion 207, can define an internal volume 208. The internal volume 208 is generally hollow, such that one or more structures, components, etc. can be positioned therein. In this example, the seal assembly 200 can be positioned at least partially within the internal volume 208.

Turning now to the seal assembly 200, the seal assembly 200 can form a hermetic barrier that limits/prevents passage of unwanted/unintended materials and/or gases through the seal assembly 200. The seal assembly 200 can be attached and sealed to the first housing portion 204 of the sensor housing 202. As such, the seal assembly 200 can form a hermetic barrier with respect to the first housing portion 204. The seal assembly 200 can therefore form/define one boundary of a sealed volume (e.g., within the first housing portion 204 and the third housing portion 207), within which a light sensitive element (e.g., a photodiode) can be located.

The seal assembly 200 can support a photodiode 220 within the internal volume 208 of the sensor housing 202. In an example, the photodiode 220 can be electrically connected to an electrical conductor 230. In some examples, the photodiode 220 can include a solid state ultraviolet (UV) sensor that receives the focused electromagnetic radiation energy from the flame 112. It is understood that a variety of photodiodes can be used in the sensor assembly 120. In one possible example, the photodiode 220 may include a silicon carbide (SiC) photodiode. In such an example, the SiC photodiode can have an operational wavelength range of about 200 nanometers to about 380 nanometers. However, the photodiode 220 is not limited to including SiC photodiodes, and in other examples, the photodiode 220 may include non-SiC photodiodes.

As the photodiode 220 receives the electromagnetic radiation energy, it generates a current output signal, such as a photocurrent, based on the electromagnetic radiation energy. The electromagnetic radiation energy can include UV radiation. The photodiode 220 can generate a photocurrent that is proportional to the intensity level of the UV radiation received. The photocurrent can be relatively low magnitude, such as in a range of about $10^{-10}$ amperes. In an example, the current output signal can be delivered from the photodiode and be conditioned and supplied to a control system. In response, the signal can be used to activate a shut-off (not shown) to stop the flow of fuel to the combustion chamber 114.

Figure 3:
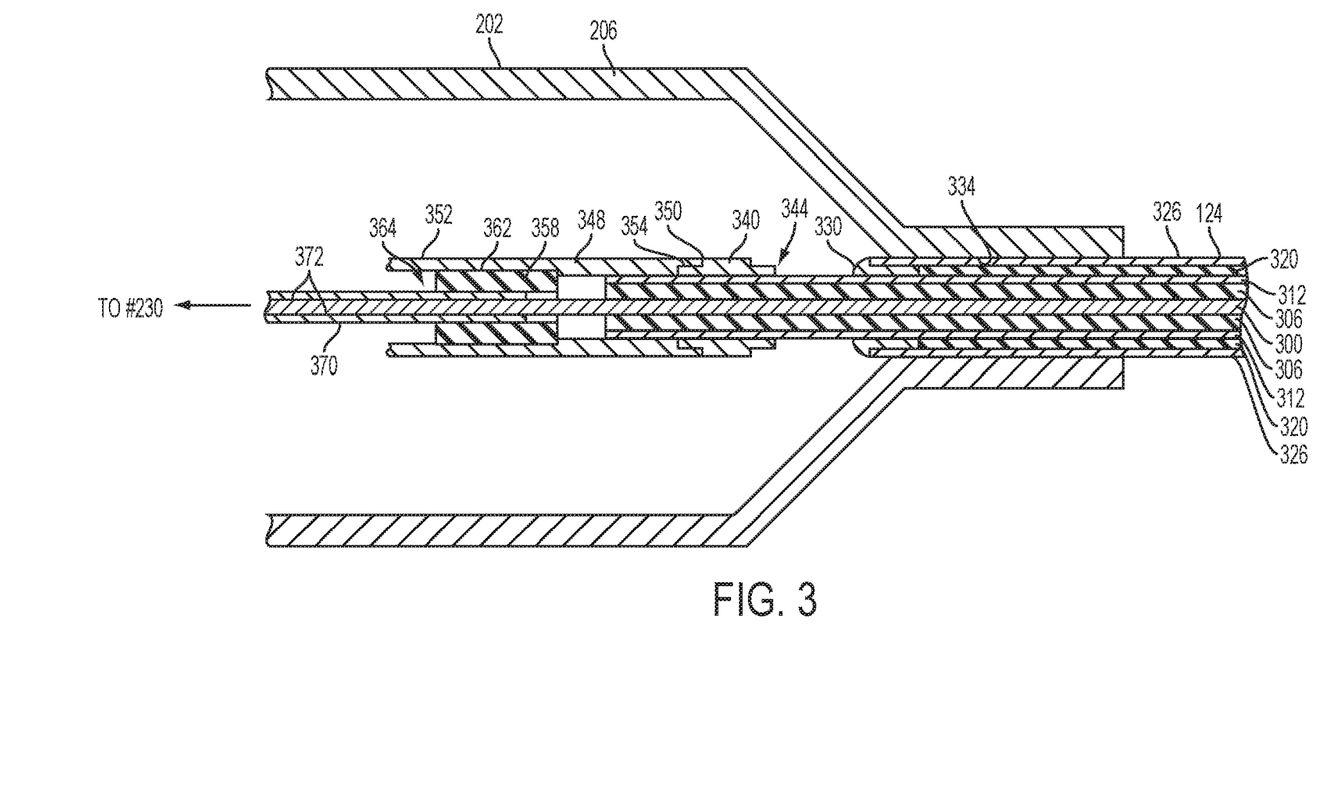
FIG. 3 is an enlarged sectional view of an example sensor assembly along lines 3-3 of FIG. 1.

Turning now to FIG. 3, a sectional view of a portion of the second housing portion 206 of the sensor housing 202 and a portion of the cable assembly 124 along lines 3-3 of FIG. 1 is illustrated. What follows is a simplified description of the cable assembly 124 for the purposes of clarity, and it is to be appreciated that the cable assembly 124 can include additional components than those described here. In addition, while one end of the cable assembly 124 is illustrated (e.g., the end of the cable assembly 124 at the sensor assembly 120), an opposing end of the cable assembly 124 can be attached and/or sealed in a similar and/or identical manner (e.g., at the electrical assembly 128). In the illustrated examples, the cable assembly 124 is a triaxial cable, having three conductive layers and two insulating layers, with an insulating layer extending radially between conductive layers.

The cable assembly 124 can include an inner conductor 300. The inner conductor 300 includes an electrically conductive material (e.g., nickel, copper, stainless steel, etc.) such that current (e.g., in the form of an electrical signal) can be transmitted through the inner conductor 300. The inner conductor 300 may be electrically connected to the photodiode 220 (illustrated in FIG. 2) that is configured to generate a current, such that the inner conductor 300 can transmit the current from the photodiode 220 and to the electrical assembly 128. In such an example, the inner conductor 300 can receive the current (e.g., the photocurrent) from the photodiode 220. The inner conductor 300 of the cable assembly 124 can convey the photocurrent, which is indicative of the flame's characteristics, from the photodiode 220 to a location that is physically remote from the photodiode 220. This location can, for example, be in a relatively cooler environment than the environment near the combustion chamber 114. In an example, the cable assembly 124 can be relatively long, such as in a range of about 9.1 to 10.7 meters (e.g. 30 to 35 feet), or greater. As such, the electrical assembly 128 can be positioned/located in this relatively cooler environment, with the photocurrent being delivered to the electrical assembly 128.

The inner conductor 300 may be directly or indirectly connected to the photodiode 220. In some examples, the inner conductor 300 may be indirectly electrically connected to the photodiode 220, such as by being electrically connected to the electrical conductor 230 (illustrated in FIG. 2) that is electrically connected to the photodiode 220. In other examples, the inner conductor 300 may be directly connected to the photodiode 220, such as by extending through the sensor housing 202 to the photodiode 220.

The cable assembly 124 includes a first insulating layer 306 that surrounds the inner conductor 300. The first insulating layer 306 can circumferentially surround the inner conductor 300. The first insulating layer 306 can extend along substantially a length of the cable assembly 124, between the sensor assembly 120 and the electrical assembly 128. The first insulating layer 306 can extend generally coaxially with respect to the inner conductor 300. The first insulating layer 306 can have an annular shape, such as by extending around an axis (e.g., circumferentially around). The first insulating layer 306 can electrically insulate the inner conductor 300 such that electrical current is generally limited from passing through the first insulating layer 306.

In an example, the first insulating layer 306 includes a mineral insulation material. Any number of different mineral insulation materials is envisioned, such as magnesium oxide, aluminum oxide, silicon dioxide, etc., for example. Providing a mineral insulation material for the first insulating layer 306 is beneficial, at least in part, due to the mineral insulation material being able to withstand relatively high temperatures. These temperatures may be in a range of 300 degrees C. or greater, to which the cable assembly 124 may be exposed in operation.

The cable assembly 124 includes an inner sheath 312 that surrounds the first insulating layer 306. The inner sheath 312 can extend along substantially a length of the cable assembly 124, between the sensor assembly 120 and the electrical assembly 128. The inner sheath 312 circumferentially surrounds the first insulating layer 306 and the inner conductor 300.

In an example, the inner sheath 312 includes an electrically conductive material (e.g., nickel, copper, stainless steel, etc.) such that current can be transmitted through the inner sheath 312. In an example, the inner sheath 312 is electrically connected to the photodiode 220, such that the inner sheath 312 can function as a shield current path. For example, the photodiode 220 can generate an electrical signal indicative of the characteristics of the flame 112. In such an example, the photocurrent can be transmitted through the inner sheath 312 to the electrical assembly 128. As such, the photocurrent can be transmitted from the photodiode 220 through at least one of the inner sheath 312 or the inner conductor 300.

The cable assembly 124 includes a second insulating layer 320 that surrounds the inner sheath 312. The second insulating layer 320 can circumferentially surround the inner sheath 312. The second insulating layer 320 can extend along substantially a length of the cable assembly 124, between the sensor assembly 120 and the electrical assembly 128. The second insulating layer 320 can extend generally coaxially with respect to the inner conductor 300, the first insulating layer 306, and the inner sheath 312. The second insulating layer 320 can have an annular shape, such as by extending around an axis (e.g., circumferentially around).

In an example, the second insulating layer 320 includes a mineral insulation material. Any number of different mineral insulation materials are envisioned, such as magnesium oxide, aluminum oxide, silicon dioxide, etc., for example. In some examples, the second insulating layer 320 includes the same mineral insulation material as the first insulating layer 306, while in other examples, the first insulating layer 306 and the second insulating layer 320 may include different mineral insulation materials. The second insulating layer 320 can electrically insulate the inner sheath 312 such that electrical current is generally limited from passing through the second insulating layer 320. Providing the mineral insulation material for the second insulating layer 320 is beneficial, at least in part, due to the mineral insulation material being able to withstand relatively high temperatures. These temperatures may be in a range of about 300 degrees C. or greater, to which the cable assembly 124 may be exposed in operation.

The cable assembly 124 includes an outer sheath 326 that surrounds the second insulating layer 320. The outer sheath 326 can extend along substantially a length of the cable assembly 124, between the sensor assembly 120 and the electrical assembly 128. The outer sheath 326 circumferentially surrounds the second insulating layer 320, the inner sheath 312, the first insulating layer 306 and the inner conductor 300.

In an example, the outer sheath 326 includes an electrically conductive material (e.g., nickel, copper, stainless steel, etc.) so as to allow for the flow of electrical current in one or more directions through the outer sheath 326. In an example, the outer sheath 326 can be electrically grounded so as to reduce the likelihood of damage to the inner sheath 312. In some examples, the outer sheath 326 includes a material having at least some degree of resistance to damage, abrasion, breakage, etc. For example, the outer sheath 326 may include a metallic material (e.g., nickel, copper, stainless steel, etc.) that can withstand relatively high temperatures, such as in a range of 300 degrees C. or greater, to which the cable assembly 124 may be exposed in operation.

The outer sheath 326 can be sealed with respect to the inner sheath 312 by a first seal 330. In an example, the first seal 330 provides a hermetic seal between the outer sheath 326 and the inner sheath 312, so as to limit the passage unwanted materials into the second insulating layer 320. These unwanted materials may include, but are not limited to, contaminants, particles, moisture (e.g., water, etc.), gases, etc. In an example, the first seal 330 includes a glass seal or an epoxy seal. As such, due to the first seal 330 sealing the outer sheath 326 with respect to the inner sheath 312, the second insulating layer 320 may be maintained within a sealed environment that is substantially gas impermeable. It will be appreciated that while only one seal (e.g., the first seal 330) is illustrated (e.g., at one end of the cable assembly 124), an opposing end (e.g., at the electrical assembly 128) of the cable assembly 124 can be sealed in a similar manner. That is, at an opposing end of the cable assembly 124 at the electrical assembly 128, the outer sheath 326 can be sealed with respect to the inner sheath 312 with another first seal 330.

In some examples, the outer sheath 326 can be attached with respect to the sensor housing 202. More particularly, the outer sheath 326 can be attached within an opening 334 of the second housing portion 206. In some examples, the outer sheath 326 can be welded, brazed, or similarly attached to the second housing portion 206. As such, unwanted materials (e.g., contaminants, particles, moisture, water, gases, etc.) are generally limited from entering the through the opening 334.

Focusing further along the cable assembly 124 (e.g., moving leftward in FIG. 3), a collar 340 can be provided in a sealing arrangement with respect to the inner sheath 312. The collar 340 can be positioned within the second housing portion 206. In the illustrated example, the inner sheath 312 can extend into the second housing portion 206 a greater distance than the outer sheath 326, such that the inner sheath 312 has a different length (e.g., longer) than the outer sheath 326.

The collar 340 can circumferentially surround the inner sheath 312 and can be spaced a distance apart from the first seal 330 and an end of the outer sheath 326. In an example, the collar 340 includes a metallic material (e.g., nickel, copper, stainless steel, etc.) so as to facilitate attachment of the collar 340 to the inner sheath 312. The collar 340 can be attached to and/or sealed with respect to the inner sheath 312 at a first attachment location 344. The collar 340 and the inner sheath 312 can be attached/sealed at the first attachment location 344 in any number of ways, such as by welding, brazing, or the like. In some examples, the seal between the collar 340 and the inner sheath 312 at the first attachment location 344 is a hermetic seal such that gases are limited from passing through the seal.

The collar 340 can contact/engage a first sleeve 348 in an axial, side-by-side arrangement. In one example, the collar 340 and the first sleeve 348 have a substantially similar cross-sectional size (e.g., diameter), such that the inner sheath 312 can be received within both the collar 340 and the first sleeve 348. The first sleeve 348 can extend between a first end 350 and a second end 352, with the first end 350 of the first sleeve 348 positioned adjacent the collar 340. The first end 350 of the first sleeve 348 can be attached and/or sealed with respect to the collar 340. In an example, the first sleeve 348 includes a metallic material (e.g., nickel, copper, stainless steel, etc.) so as to facilitate attachment of the first sleeve 348 to the collar 340. The first sleeve 348 can be attached and/or sealed with respect to the collar 340 at a second attachment location 354. The first sleeve 348 and the collar 340 can be attached/sealed in any number of ways, such as by welding, brazing, or the like. In some examples, the seal between the first sleeve 348 and the collar 340 at the second attachment location 354 is a hermetic seal, such that gases are limited from passing through the seal.

It will be appreciated that the first sleeve 348 is not limited to the structure illustrated in FIG. 3. For example, as illustrated, the first sleeve 348 includes a single piece structure that extends between the first end 350 and the second end 352. In other examples, however, the first sleeve 348 may include a plurality of structures that, together, form the first sleeve 348. For example, the first sleeve 348 may include a plurality of pieces, structures, etc. that may be joined together in an end-to-end configuration. In these examples, the plurality of pieces, structures, etc., that form the first sleeve 348 can extend in a coaxial configuration.

Moving away from the first end 350 and towards the second end 352 of the first sleeve 348, the first sleeve 348 can circumferentially surround a third insulating layer 358. The third insulating layer 358 can be disposed within the second housing portion 206. The third insulating layer 358 can circumferentially surround a second sleeve 370. The third insulating layer 358 can extend generally coaxially with respect to the inner conductor 300 and the first sleeve 348. In the illustrated example, the third insulating layer 358 has an annular shape, such as by extending around an axis (e.g., circularly, etc.) within the second housing portion 206. The third insulating layer 358 may be spaced a distance apart from an end of the first insulating layer 306 and the inner sheath 312.

The third insulating layer 358 includes any number of materials, including a ceramic insulation material that has at least some degree of electrical insulation. Accordingly, the third insulating layer 358 can electrically insulate the first sleeve 348 from the second sleeve 370 such that electrical current is generally limited from passing through the third insulating layer 358. In an example, the third insulating layer 358 can be attached and/or sealed with respect to the first sleeve 348 at a third attachment location 362. The first sleeve 348 and the third insulating layer 358 can be sealed in any number of ways, such as with a hermetic ceramic to metal seal. As such, when a hermetic seal is formed between the first sleeve 348 and the third insulating layer 358, gases are generally limited from passing through this hermetic seal (e.g., gas impermeable).

The third insulating layer 358 can circumferentially surround the second sleeve 370. The second sleeve 370 can be disposed within the second housing portion 206. The second sleeve 370 can circumferentially surround the inner conductor 300. The second sleeve 370 extends generally coaxially with respect to the inner conductor 300 and the third insulating layer 358, with the second sleeve 370 disposed radially between the inner conductor 300 and the third insulating layer 358. In the illustrated example, the second sleeve 370 has an annular shape, such as by extending around an axis (e.g., circularly, etc.) within the second housing portion 206. The second sleeve 370 may be spaced a distance apart from an end of the first insulating layer 306 and the inner sheath 312.

The second sleeve 370 can be attached and/or sealed with respect to the third insulating layer 358 at a fourth attachment location 364. In an example, the second sleeve 370 includes a metallic material (e.g., nickel, copper, stainless steel, etc.). The second sleeve 370 can be attached and/or sealed with respect to the third insulating layer 358 in any number of ways, such as with a hermetic ceramic to metal seal. As such, when a hermetic seal is formed between the second sleeve 370 and the third insulating layer 358, gases are generally limited from passing through this hermetic seal (gas impermeable).

The second sleeve 370 can be attached and/or sealed with respect to the inner conductor 300. In an example, the second sleeve 370 can be attached and/or sealed with respect to the inner conductor 300 at a fifth attachment location 372. The second sleeve 370 and the inner conductor 300 can be attached/sealed in any number of ways, such as by welding, brazing, or the like. In some examples, the seal between the second sleeve 370 and the inner conductor is a hermetic seal, such that gases are limited from passing through the seal.

Figure 4:
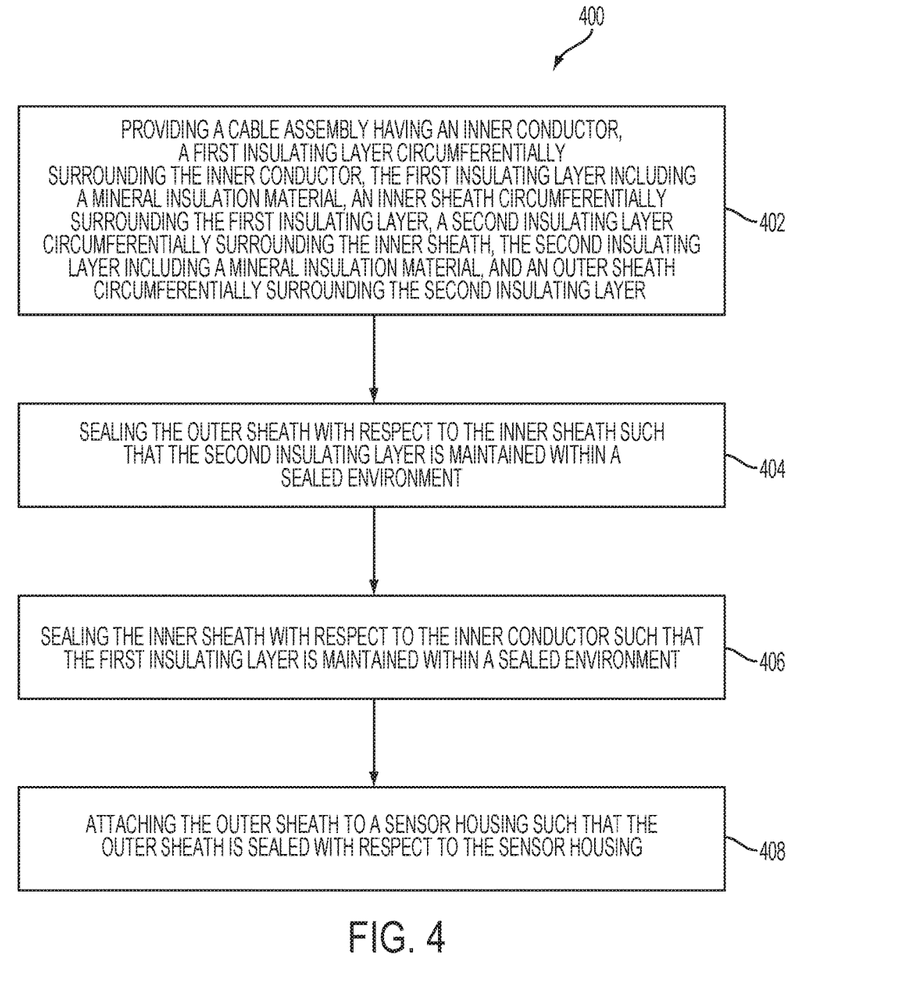
FIG. 4 is a flow chart for an example method of attaching a cable assembly for a flame sensor apparatus in accordance with at least one aspect of the subject matter.

Turning to FIG. 4, an example method 400 of attaching the cable assembly 124 to the sensor housing 202 for the flame sensor apparatus 110 is illustrated. In an example, the method 400 includes a step 402 of providing the cable assembly 124. The cable assembly 124 includes the inner conductor 300 electrically connected to the photodiode 220. In some examples, the inner conductor 300 can be directly connected to the photodiode 220 so as to transmit a current generated by the photodiode 220 while in other examples, the inner conductor 300 can be indirectly connected (e.g., through the electrical conductor 230 illustrated in FIG. 2) to the photodiode 220. The cable assembly 124 includes the first insulating layer 306 circumferentially surrounding the inner conductor 300. The first insulating layer 306 can include a mineral insulation material. The cable assembly 124 includes the inner sheath 312 circumferentially surrounding the first insulating layer 306. The cable assembly 124 includes the second insulating layer 320 circumferentially surrounding the inner sheath 312, with the second insulating layer 320 including a mineral insulation material. The cable assembly 124 includes the outer sheath 326 circumferentially surrounding the second insulating layer 320.

The method 400 includes a step 404 of sealing the outer sheath 326 with respect to the inner sheath 312 such that the second insulating layer 320 is maintained within a sealed environment. In an example, the outer sheath 326 is sealed with respect to the inner sheath 312 with the first seal 330. The first seal 330 can include a glass seal or an epoxy seal, such that moisture, particles, gases, or the like are limited from traversing through the first seal 330. It is to be appreciated that the first seal 330 is illustrated at one end (e.g., within the sensor housing 202) of the cable assembly 124. However, in other examples, the first seal 330 can be similarly provided at an opposing end of the cable assembly 124 (e.g., at the electrical assembly 128). As such, the outer sheath 326 and the inner sheath 312 can be sealed at opposing ends (e.g., with first seals 330) such that the second insulating layer 320 is maintained within a sealed environment.

The method 400 includes a step 406 of sealing the inner sheath 312 with respect to the inner conductor 300 such that the first insulating layer 306 is maintained within a sealed environment. In this example, the collar 340 can be sealed with respect to the inner sheath 312 at the first attachment location 344. The collar 340 can be sealed with respect to the inner sheath 312 by welding or brazing, such that a hermetic seal is provided. The collar 340 can also be attached and/or sealed with respect to the first sleeve 348 at the second attachment location 354. The first sleeve 348 can be sealed with respect to the collar 340 by welding or brazing, such that a hermetic seal is provided. The first sleeve 348 can be attached and/or sealed with respect to the third insulating layer 358, such as with a hermetic ceramic to metal seal. The third insulating layer 358 can be attached and/or sealed with respect to the second sleeve 370, with the second sleeve 370 hermetically sealed with respect to the inner conductor 300. As such, the inner conductor 300 may be sealed with respect to the inner sheath 312 so as to maintain the first insulating layer 306 (disposed between the inner conductor 300 and the inner sheath 312) in a sealed environment.

It is to be appreciated that the seal between the inner conductor 300 and the inner sheath 312 (e.g., with the collar 340, the first sleeve 348, the third insulating layer 358, the second sleeve 370, etc.) is illustrated at one end (e.g., within the sensor housing 202) of the cable assembly 124. However, in other examples, a similar seal can be similarly provided at an opposing end of the cable assembly 124 (e.g., at the electrical assembly 128). As such, the inner conductor 300 and the inner sheath 312 can be sealed at opposing ends such that the first insulating layer 306 is maintained within a sealed environment.

The method 400 includes a step 408 of attaching the outer sheath 326 to the sensor housing 202 such that the outer sheath 326 is sealed with respect to the sensor housing 202. In an example, the cable assembly 124, including the outer sheath 326, is positioned to extend through the opening 334 in the second housing portion 206 of the sensor housing 202. As such, the cable assembly 124 can extend at least partially through the opening 334 and into the internal volume 208 of the sensor housing 202. In some examples, the outer sheath 326 can be attached and/or sealed with respect to the second housing portion 206 within the opening 334.

The cable assembly 124 illustrated and described herein provides a number of benefits. For example, the cable assembly 124 includes the first insulating layer 306 and the second insulating layer 320. These insulating layers may include a mineral insulation material that is capable of withstanding relatively high temperatures, such as temperatures in a range of about 300 degrees C. or greater. The cable assembly 124 can thus be exposed to these relatively high temperatures with reduced likelihood of breakdown of the insulating layers as a result of temperature. Additionally, the mineral insulation material can withstand these relatively high temperatures without losing significant electrical insulation resistance. As such, even when the cable assembly 124 is exposed to relatively high temperatures (e.g., about 300 degrees C. or greater), the first insulating layer 306 and the second insulating layer 320 may continue to function effectively by electrically insulating the conductive layers (e.g., inner conductor 300, inner sheath 312, outer sheath 326) from one another.

The disclosed subject matter has been described with reference to the example embodiments described above. Modifications and alterations will occur to others upon a reading and understanding of this specification. Example embodiments incorporating one or more aspects of the subject matter are intended to include all such modifications and alterations insofar as they come within the scope of the appended claims.

What is claimed:

1. A flame sensor apparatus for sensing presence of a flame within a combustion chamber of a turbine, the apparatus comprising a sensor assembly, an electrical assembly and a cable assembly extending between the sensor assembly and the electrical assembly;

the sensor assembly comprising a photodiode configured to generate an electrical signal indicative of at least one characteristic of the flame and further comprising a first housing portion coupled to a second housing portion at a first circular end and a third housing portion at a second circular end, the first, second, and third housing portions each having a cylindrical cross-section and extending coaxially with respect to each other along a common axis;

the electrical assembly being configured to receive the electrical signal and being configured to determine the at least one characteristic of the flame; and the cable assembly comprising:
an inner conductor electrically connected to the photodiode and configured to transmit the electrical signal from the photodiode to the electrical assembly;
a first insulating layer circumferentially surrounding the inner conductor, the first insulating layer comprising a mineral insulation material;
an inner sheath circumferentially surrounding the first insulating layer, the inner sheath comprising an electrically conductive material;
a second insulating layer circumferentially surrounding the inner sheath, the second insulating layer comprising a mineral insulation material; and
an outer sheath circumferentially surrounding the second insulating layer, the outer sheath comprising an electrically conductive, metal material, wherein the cable assembly is configured for use up to about 300 degrees Celsius or greater;

wherein the outer sheath, the second insulating layer, the inner sheath and the first insulating layer are constructed and configured, and connected between the sensor assembly and the electrical assembly, to enclose the inner conductor such that the inner conductor is not exposed outside of confines of the cable.

2. The cable assembly of claim 1, wherein the outer sheath is sealed with respect to the inner sheath such that the second insulating layer is maintained within a sealed environment.

3. The cable assembly of claim 2, wherein the outer sheath is sealed with respect to the inner sheath by a glass seal or an epoxy seal.

4. The cable assembly of claim 1, wherein the inner sheath is sealed with respect to the inner conductor such that the first insulating layer is maintained within a sealed environment.

5. The cable assembly of claim 4, comprising a collar sealed with respect to the inner sheath.

6. The cable assembly of claim 5, wherein the collar is sealed with respect to the inner sheath by welding or brazing.

7. The cable assembly of claim 5, comprising a first sleeve sealed with respect to the collar.

8. The cable assembly of claim 7, wherein the first sleeve is sealed with respect to the collar by welding or brazing.

9. The cable assembly of claim 7, comprising:
a second sleeve circumferentially surrounding the inner conductor, and
a third insulating layer circumferentially surrounding the second sleeve.

10. The cable assembly of claim 9, wherein the third insulating layer comprises a ceramic insulation material.

11. The cable assembly of claim 9, wherein the first sleeve circumferentially surrounds the third insulating layer, and the first sleeve is sealed with respect to the third insulating layer.

12. A method of providing a flame sensor apparatus for sensing presence of a flame within a combustion chamber of a turbine, the method comprising:
providing a sensor assembly, with the sensor assembly having a photodiode configured to generate an electrical signal indicative of at least one characteristic of the flame and including a first housing portion coupled to a second housing portion at a first circular end and a third housing portion at a second circular end, the first, second, and third housing portions each having a circular cross-section and extending coaxially with respect to each other along a common axis;
providing an electrical assembly, with the electrical assembly configured to receive the electrical signal indicative of at least one characteristic of the flame and being configured to determine the at least one characteristic of the flame;
providing a cable assembly to extend between the sensor assembly and the electrical assembly, the cable assembly having:
an inner conductor electrically connected to the photodiode and configured to transmit the electrical signal from the photodiode to the electrical assembly;
a first insulating layer circumferentially surrounding the inner conductor, the first insulating layer comprising a mineral insulation material;
an inner sheath circumferentially surrounding the first insulating layer, the inner sheath comprising an electrically conductive material;
a second insulating layer circumferentially surrounding the inner sheath, the second insulating layer comprising a mineral insulation material; and
an outer sheath circumferentially surrounding the second insulating layer, the outer sheath comprising an electrically conductive, metal material, wherein the cable assembly is configured for use up to about 300 degrees Celsius or greater, and
constructing and configuring the outer sheath, the second insulating layer, the inner sheath and the first insulating layer, and connecting the outer sheath metal, the second insulating layer, the inner sheath and the first insulating layer between the sensor assembly and the electrical assembly, to enclose the inner conductor such that the inner conductor is not exposed outside of confines of the cable.

13. The method of claim 12, comprising sealing the outer sheath with respect to the inner sheath such that the second insulating layer is maintained within a sealed environment.

14. The method of claim 12, comprising sealing the inner sheath with respect to the inner conductor such that the first insulating layer is maintained within a sealed environment.

15. The method of claim 14, comprising sealing a collar with respect to the inner sheath.

16. The method of claim 15, comprising sealing a first sleeve sealed with respect to the collar.

17. The method of claim 16, comprising:
providing a second sleeve circumferentially surrounding the inner conductor, and
providing a third insulating layer circumferentially surrounding the second sleeve.

18. The method of claim 17, wherein the third insulating layer having a ceramic insulation material.

19. The method of claim 17, wherein the first sleeve circumferentially surrounds the third insulating layer, and sealing the first sleeve with respect to the third insulating layer.

20. The method of claim 14, comprising sealing the collar with respect to the inner sheath by welding or brazing.

* * * * *